No. 775,896. PATENTED NOV. 22, 1904.
R. J. CRACKNELL.
ABSORBER FOR AMMONIA ABSORPTION REFRIGERATING MACHINES.
APPLICATION FILED FEB. 12, 1904.
NO MODEL.
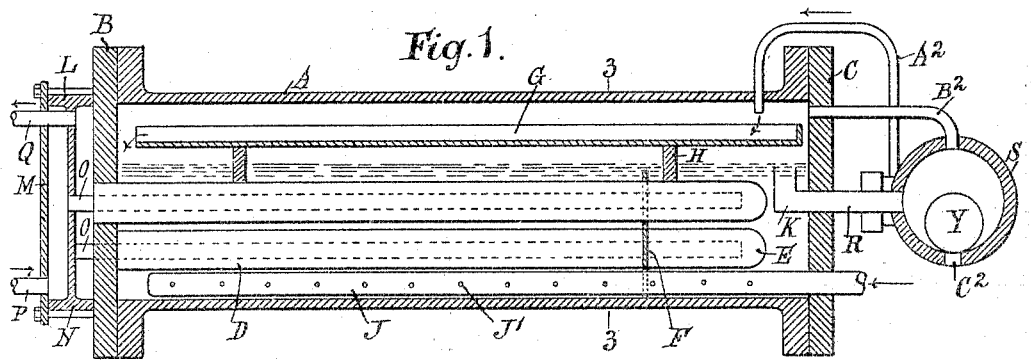
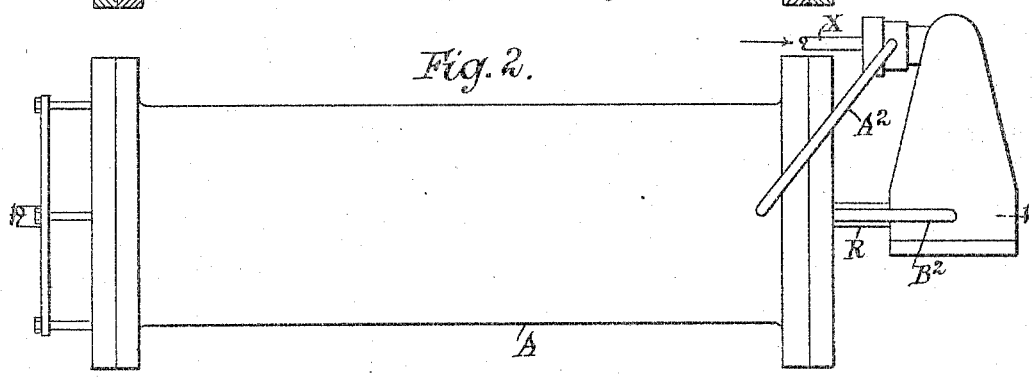
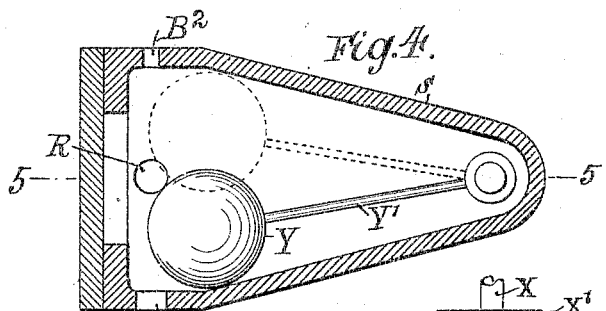
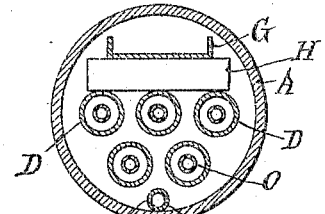
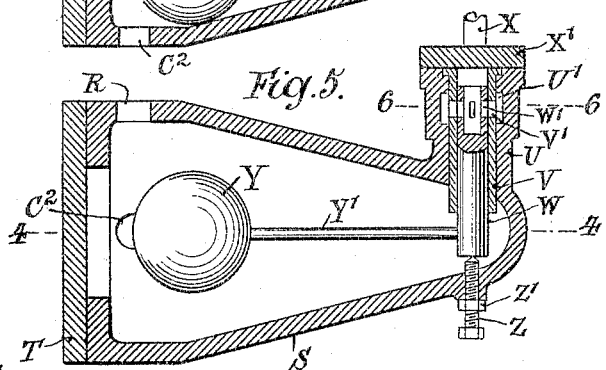
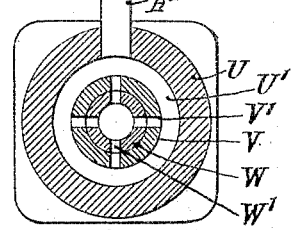
Witnesses:
Inventor:
Richard J. Cracknell
By Wm. E. Boulter, attorney No. 775,896. Patented November 22, 1904.

UNITED STATES PATENT OFFICE.

RICHARD JOHN CRACKNELL, OF STREATHAM, ENGLAND.

ABSORBER FOR AMMONIA-ABSORPTION REFRIGERATING-MACHINES.

SPECIFICATION forming part of Letters Patent No. 775,896, dated November 22, 1904.

Original application filed August 30, 1902, Serial No. 121,662. Divided and this application filed February 12, 1904. Serial No. 193,309.

(No model.)

*To all whom it may concern:*

Be it known that I, RICHARD JOHN CRACKNELL, engineer, a subject of the King of Great Britain, residing at 5 Farnan road, Streatham, in the county of Surrey, England, have invented certain new and useful Improvements in Absorbers for Ammonia - Absorption Refrigerating-Machines, of which the following is a specification.

The present application is a division of my former application, filed August 30, 1902, Serial No. 121,662, and which has since matured into Patent No. 751,058, dated February 2, 1904.

In an ammonia-absorption refrigerating-machine the absorber is that part of the apparatus in which the weak liquor reabsorbs the ammonia which was separated from it in the generator, the strong ammonia solution so formed being pumped back into the generator to be used over again.

The object of this invention is to construct the absorber and connections so that the strongest solution of ammonia is obtained, while at the same time the rate of flow of the weak liquor into the absorber is regulated automatically and so as to provide a practically uniform level of the liquid in the absorber.

In order that my invention may be clearly understood, I will now proceed to describe it with reference to the accompanying drawings, in which—

Figure 1 is a section of an absorber and connections taken on the line 1 1 of Fig. 2. Fig. 2 is a plan of same. Fig. 3 is a section on the line 3 3 of Fig. 1. Fig. 4 is an enlarged section of the float-actuated valve on the line 4 4 of Fig. 5. Fig. 5 is a section of the same on the line 5 5 of Fig. 4, and Fig. 6 is an enlarged section of same on the line 6 6 of Fig. 5.

The same letters in the different figures refer to the same parts.

Referring now to Fig. 1, A is a cylindrical vessel having covers B and C bolted on. Fixed into the cover B are tubes D, closed at their inner ends E and supported by a tube-plate F. Above the tubes D is a tray G, supported by the supports H H, the tray being open at the end near to the cover B. Along the bottom of the vessel A is a perforated pipe J, having perforations J', which is fixed into the cover C and closed at its inner end. Fixed into the cover C is an overflow-pipe K, the upper edge of which is just above the tops of the tubes D. The overflow-pipe K must be larger in area than the opening $C^2$, to which the suction-pipe to the ammonia-pump is connected. Outside the cover B is a header L, with a cover M bolted to the cover B by bolts N. Fixed into the header L are small open-ended tubes O, which pass down inside the tubes D almost to their closed ends. A pipe P is fixed into the cover M, and a pipe Q passes through the cover M and is fixed into the header L. Attached to the cover C by the pipe R is a float-actuated valve, which is shown more clearly in Figs. 4, 5, and 6, in which S is an outer casing, having a cover T bolted on its end and a branch U on one side. Inside the branch U is fitted a sleeve or liner V, having holes or ports V' cut through it. The branch U is so formed as to leave an annular space U' around the sleeve V. Inside the sleeve is a rotatable valve W, hollowed out at one end and having holes or ports W' cut through it to correspond to the ports V' in the sleeve V. A pipe X is connected to the branch U by a flange X'. A float Y is attached to the valve W by means of an arm Y'. A screw Z, having a lock-nut Z', passes through the casing S at the center of the rotatable valve W. The pipe R forms a communication from the inside of the casing S to the overflow-pipe K. A pressure-equalizing pipe $B^2$ forms a communication from the top of the casing S to the upper part of the vessel A through the cover C. A pipe $A^2$ forms a communication from the annular space U' through the vessel A above the tray G. The float Y is attached to the valve W in such a way that when it is in the position shown the ports in the valve W are opposite the ports in the sleeve V, and a communication is thus open from the pipe X to the pipe $A^2$. When the float rises to the position shown in dotted lines in Fig. 4, the valve rotates slightly and the ports W' are out of register with the ports V' and the communication from the pipe X to the pipe $A^2$ is cut off. The suction-pipe of an ammonia-pump (not shown) is connected to the opening $C^2$ of the casing S.

The action of the apparatus is as follows: Weak liquor from the generator, previously cooled, enters by the pipe X through the ports in the valve and sleeve into the annular space U' and out by the pipe $A^2$ onto the tray G, falling off the other end thereof into the vessel A outside the tubes D. When the vessel A is filled up to the level of the overflow-pipe K, the liquid begins to overflow into the casing S of the float-valve, causing the float to rise and close the valve, and thus shut off the admission of weak liquor through the pipe X. The ammonia-gas to be absorbed enters by the pipe J and passes through the perforations J' in the latter into the weak liquor, which absorbs it. Any gas passing through the liquor without being absorbed is absorbed by the weak liquor flowing along the tray G. The ammonia liquor in the vessel A is cooled by cooling-water, which enters by the pipe P, passing thence through the small tubes O to the closed ends of the tubes D, flowing back through the latter and out by the pipe Q. When the ammonia-pump is started, the ammonia liquor in the casing S is drawn away through the opening $C^2$, and as soon as the level of the liquor in the vessel A falls so that it ceases to overflow by the overflow-pipe K and pipe R the float falls and opens the ports in the valve, allowing the weak liquor to again pass through the pipe $A^2$, causing the level to again rise in the vessel A, whence it overflows and fills up the casing S, raising the float and closing the valve. The rate of flow of the weak liquor is thus automatically regulated according to the speed of the pump.

I am aware that it has previously been proposed to use a float-valve for a similar purpose; but it has been applied in such a way that the suction-pipe to the pump has been taken from the vessel A direct, and the level of the liquor around the float was always exactly the same as in the vessel A. By that arrangement the level of the ammonia liquor in the vessel A might vary as much as three or four inches, as when the float-valve is full open the float will require to rise as much as this before closing the valve. By my invention an increase in the level of the liquor in the vessel A by one-eighth of an inch may be sufficient to cause the float to rise three or four inches. The consequence of this is that the level of the liquor in the vessel A varies very slightly. The weak liquor has to pass the whole length of the vessel A in the opposite direction to the flow of the cooling-water in the tubes D, during which time it is absorbing ammonia-gas passing into it through the perforations in the pipe J, and when it reaches the overflow-pipe K it will be cooled to its lowest point and will have reached its maximum strength. Also the strongest ammonia is just on the surface of the liquor, and as the level varies very slightly it is always the strongest liquor which passes into the casing S and so to the ammonia-pump.

Having fully described my invention, what I claim, and desire to secure by Letters Patent, is—

1. In ammonia-absorption refrigerating-machines of the continuous type, the combination with an absorber vessel, of an overflow-pipe therefor, a valve-casing in communication with said overflow-pipe and receiving the strong liquor which overflows from the absorber vessel, a pipe leading from the casing into the upper part of the absorber vessel and adapted to conduct the weak liquor into said vessel, a valve in the valve-casing operating to control the supply of weak liquor through said last-mentioned pipe to the absorber vessel, a float in the casing adapted to actuate the said valve and thus automatically control the flow of weak liquor to the absorber vessel, and an outlet in the valve-casing to which the suction-pipe of an ammonia-pump is adapted to be connected.

2. In ammonia-absorption refrigerating-machines of the continuous type, the combination with an absorber vessel, of cooling-pipes arranged therein, a tray arranged above said pipes and adapted to receive weak liquor at one end and discharge the same at the opposite end into the absorber vessel, an overflow-pipe for the absorber vessel, a valve-casing in communication with said overflow-pipe and receiving the strong liquor which overflows from the absorber vessel, a pipe leading from the casing into the upper part of the absorber vessel and adapted to conduct the weak liquor into the tray at one end thereof, a valve in the valve-casing operating to control the supply of weak liquor through said last-mentioned pipe to the absorber vessel, a float in the casing adapted to actuate the said valve and thus automatically control the flow of weak liquor to the absorber vessel, and an outlet in the valve-casing to which the suction-pipe of an ammonia-pump is adapted to be connected.

In testimony whereof I have hereunto set my hand, in presence of two subscribing witnesses, this 28th day of January, 1904.

RICHARD JOHN CRACKNELL.

Witnesses:
   WILLIAM S. ABRAHAM,
   WALTER J. SKERTEN.